W. A. PATTERSON.
COTTON THRESHING MACHINE.
APPLICATION FILED OCT. 24, 1916.

1,227,652.

Patented May 29, 1917.
2 SHEETS—SHEET 1.

INVENTOR
Warren A. Patterson
BY
ATTORNEY

W. A. PATTERSON.
COTTON THRESHING MACHINE.
APPLICATION FILED OCT. 24, 1916.

1,227,652.

Patented May 29, 1917.
2 SHEETS—SHEET 2.

INVENTOR
Warren A. Patterson
ATTORNEY

UNITED STATES PATENT OFFICE.

WARREN A. PATTERSON, OF WICHITA FALLS, TEXAS, ASSIGNOR OF ONE-HALF TO JOSEPH A. KEMP, OF WICHITA FALLS, TEXAS.

COTTON-THRESHING MACHINE.

1,227,652.  Specification of Letters Patent.  Patented May 29, 1917.

Application filed October 24, 1916. Serial No. 127,402.

*To all whom it may concern:*

Be it known that I, WARREN A. PATTERSON, a citizen of the United States of America, residing at Wichita Falls, in the county of Wichita, State of Texas, have invented certain new and useful Improvements in Cotton-Threshing Machines, of which the following is a specification.

This invention relates to harvesting machines and is particularly conceived and designed for use in harvesting cotton and in threshing the cotton locks from the bolls and stalks.

In the use of the machine comprising this invention the cotton will be allowed to open to its maximum maturity and then cut bodily by any approved form of cutting machine and thereafter stacked and arranged in windrows in the field. The cotton will then be conveyed to the threshing machine, which machine will be accessibly located in the field which will obviate long distant carrying of the stalks to the thresher. This machine will be built according to a design convenient and minimum in size, provided with transport wheels which will allow it to be easily transported from one portion of a field to another to best reach the cotton to be threshed.

The particular purpose of the invention is to provide a plurality of revolving beaters and cleaners so arranged in operative assembly that the locks and fibrous product are removed from the stalks and bolls as the cotton stalks are fed through the machine.

With the above and other objects in view the invention has relation to a certain combination and arrangement of parts, an example of which comprises the present invention and is described in the following specification pointed out in the appended claims and illustrated in the accompanying drawings; whereof, Figure 1 illustrates the cotton thresher in side elevation showing the side of the machine from which the various elements are driven.

Figure 1:
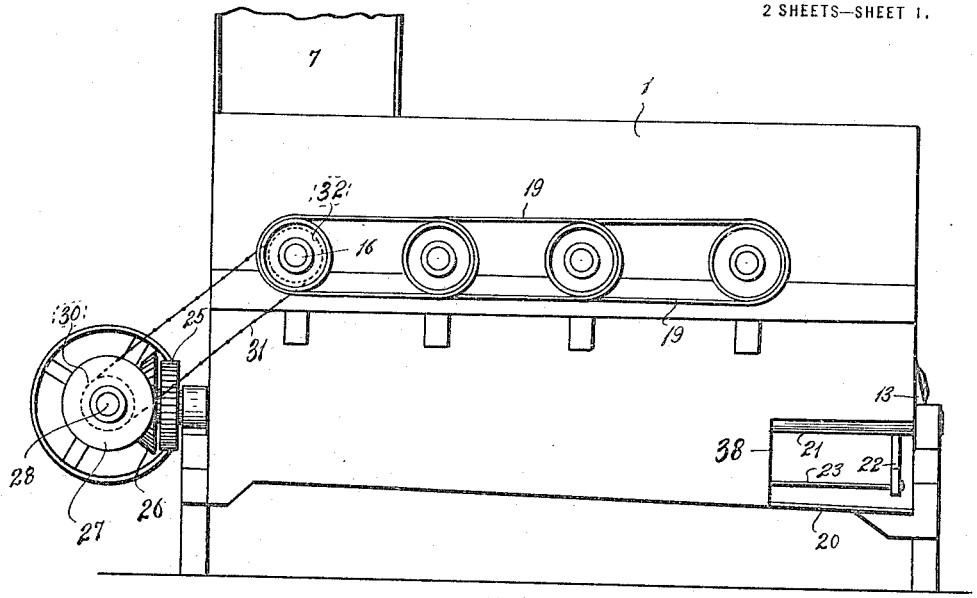
Figure 2:
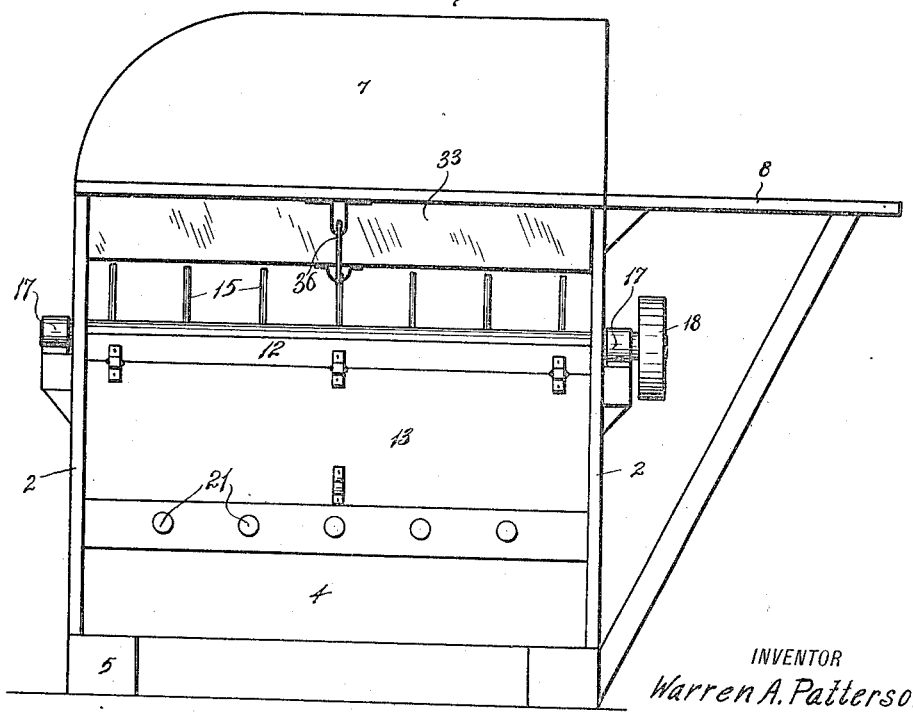
Fig. 2 is an illustration of the rear elevation of the machine.

Referring now more in particular to the drawings, wherein identical parts throughout the several views are designated by the same reference characters, the numeral 1 points out the vertical side walls of the housing of the machine. The closed front end of the machine is designated by the numeral 2, leaving open the rear end of the housing of the machine. Substantially heavy beams 4 are transversely arranged in a manner designed to carry said machine from support legs 5. The forward extremity of the machine has provided therein a substantially large opening 6 in the top thereof, which opening is provided with an open ended cotton stalk receiving spout 7, which spout opens directly upon a platform 8 provided at the side of the machine and adapted to receive cotton stalks as they are thrown thereupon prior to being fed through the receiving spout into the machine.

Figure 3:
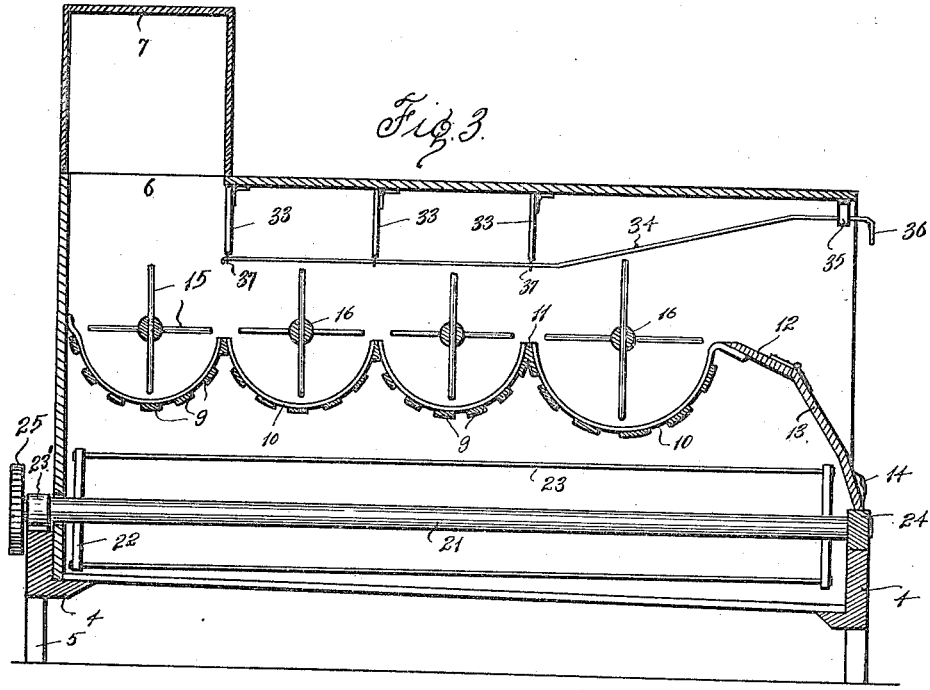
Fig. 3 is a vertical longitudinal sectional view of the cotton thresher.

A plurality of cotton threshing cradles is transversely arranged in the machine the cradles arranged in an arcuate form, the extremities of which join each other as indicated in Fig. 3, the assembly of which forms a substantially long and continuous battery of threshing cradles over which the cotton stalks will be passed yielding their fibrous product into said cradles as they are forcibly carried through the machine. The threshing cradles comprise a plurality of transverse ribs or laths 9, preferably of metal, extending across the entire width of the machine and fixed to the side walls thereof, and properly spaced apart and securely fixed to arcuate or circular members 10, which members 10 have their extremities supported by and joined to transverse beams 11. The threshing cradle located at the rear end of the machine is designed and formed on a somewhat larger proportion than the companion thresher cradles. A plate 12 is disposed adjacent to the last mentioned thresher cradle and is joined to said cradle. A trap door 13, provided with a handle 14, is hinged to plate member 12. This pivoted door is provided to give admission into the lower chamber of the machine for any purposes which may arise, as to cleaning the cotton therefrom or to make any adjustment in the mechanism which might become necessary.

A revolving beater is provided to work within the cradles and comprises a plurality of beater arms 15, carried by a shaft 16, which shaft is journaled in bearings 17 disposed upon the sides of the machine. The beater arms radiating from the shaft are a sufficient length to move in revolution in close proximity to the ribs of the cradles. Each threshing cradle and correlated revolving beater will form an agitating pocket for catching, beating and separating the locks from the stalks, as later seen in the description hereinafter given. The shaft 16 of the revolving beaters have their outer extremities provided with pulleys 18, adapted to be driven one from the other through belts or any effective form of driving medium, belts 19 being illustrated in the drawings.

Figure 4:
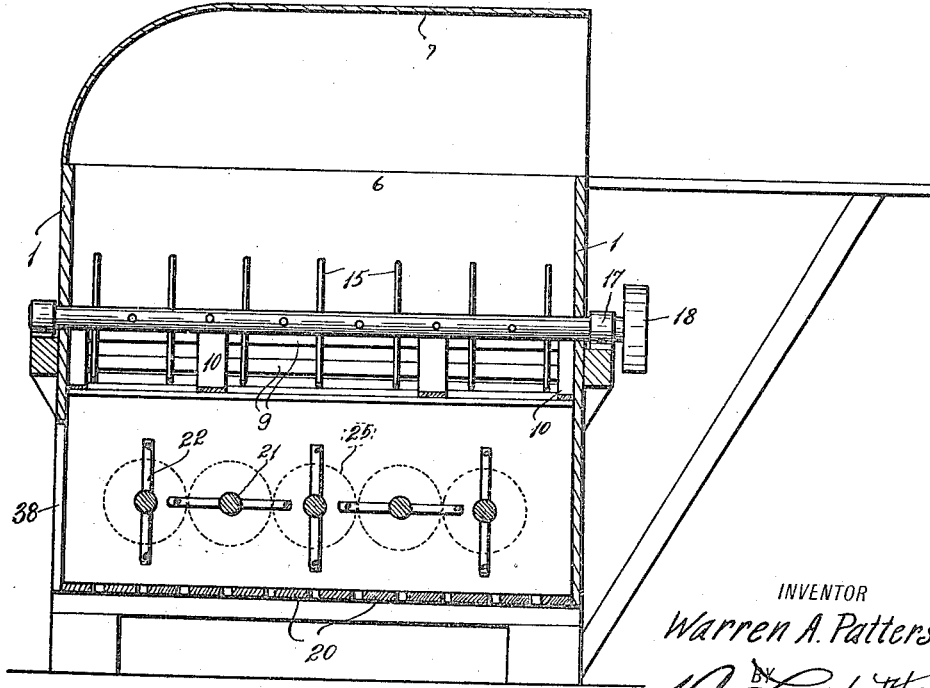
Fig. 4 is a transverse sectional view of said machine.

The floor of the housing of the threshing machine is provided with a plurality of slots extending longitudinally from one extremity of the machine to the other, said slots being formed between the many ribs 20 extending parallel one with another. The slotted floor is arranged lower at one end of the machine than at the other, the difference in the heights thereof being very little, as illustrated in Fig. 3. A plurality of substantially long cotton revolving stirrers are journaled longitudinally in the lower portion of the machine. Each revolving stirrer comprises a substantially heavy shaft 21 provided with two arms 22. Each arm is securely mounted upon the shaft by passing through same and is arranged in the shaft close to each end of the machine, said arms 22 being disposed in said shaft in a common plane. Heavy wires or substantially small rods 23 are carried between the outer extremities of the arms 22 and tightly drawn therebetween. Each revolving stirrer comprises a construction similar to the foregoing description. The said stirrers are all journaled in a common horizontal plane adapted to revolve in approximately close relation to the slotted floor. The battery of revolving stirrers as described has each alternate member with its assembled arms carrying the taut wires arranged in a plane at right angles to the plane of the adjacent revolving stirrers. This arrangement of the stirring wires in alternate vertical and horizontal disposition permits the close assembly of each member with the other and allows the beater to revolve at a high rate of speed, the stirring wires running very close to the shafts but never interfering with same. Each shaft 21 projects through the forward portion of the machine and is journaled in bearings 23′ which are formed *en bloc* to insure rigidity and strength and permanency in construction. The rear extremities of the shafts 21 are likewise journaled in a common bearing block 24, supported on the rear beam 4. A gear 25 is fixed to the forward extremity of the shaft 21 and adjacent to the bearing 23, each gear meshing with the adjacent gear and adapted to drive the battery of stirrers. The geared transmission for driving the stirrers is indicated by dotted lines in Fig. 4. One of the shafts 21 of the battery of stirrers, and preferably the central shaft, has fixed thereto a beveled gear 26 adjacent to the gear 25. Said gear is adapted to mesh and be driven through a second beveled gear 27 fixed upon a shaft 28, which shaft is provided with a driving pulley 29, which will have transmitted thereto sufficient power to drive the mechanism of the cotton thresher. A chain sprocket wheel 30 is fixed to the shaft 28 and adapted to drive through a chain 31 a sprocket wheel 32, which sprocket wheel 32 is fixed to the forward shaft 16. The arrangement of the driving transmission as described gives provision for driving the revolving beaters and stirrers.

A number of baffle-plates 33 are pivoted to the upper horizontal wall of the housing and depend therefrom at a point equidistant between the revolving beaters 15. Said baffle-plates have a pivoted connection with a substantially long shift rod 34, which rod extends beneath and along the center of the baffle-plates and rearwardly through a loop support 35 and down turned in the form of a handle 36. The member 34 has a loose linked connection with each baffle-plate as indicated by the numeral 37. This allows the baffle-plates to be changed in adjustment from a vertical arrangement, as shown, to any angular arrangement which the operator may desire, this change being effected by drawing outwardly the rod from the rear of the machine to any desired adjustment.

In the operation of this cotton threshing machine the cotton will be delivered to the receiving platform 8, and there properly apportioned and fed into the receiving spout or head 7 down through the opening 6 upon the first revolving beater. The high speed of the revolving beater subjects the cotton stalks to such a severe agitation that a large quantity of the cotton locks is immediately jerked and drawn from the stalks. The revolution of the beater beats the stalks forward into the companion beaters and cradles which adjacent beater continues a similar action and passes the stalks on to the next beater. Through the battery of revolving beaters the stalks are passed on and finally ejected from the rear of the machine by the last and larger member. During this stage of the operation the locks are thrown and worked through the ribbed and slatted cradles. The cotton locks and in some cases bolls and a small percentage of limbs and leaves from the plants are received into the lower portion of the machine and into the chamber of revolving stirrers where the cotton is subjected to a terrific rotary action of the wire stirrers, which sets up such an agitated movement in the cotton that the small quantity of limbs, leaves or possibly any trash which might be admitted thereto will be worked out through the slots in the floor 20 leaving a clean body of cotton which cotton gradually works rearwardly along the sloping slotted floor and out of a substantially large opening 38 provided in the side wall thereof.

The invention is presented to include all modifications and changes which might be construed to come within the purview of the following claims.

Claims:

1. In a threshing machine for the purpose of separating cotton from stalks, the combination of a plurality of slatted cradles, of a revolving beater journaled in close relation with each cradle, of a plurality of revolving stirrers arranged beneath the cradles and transversely thereto, and means for feeding unpicked cotton into said machine.

2. In a cotton threshing machine, the combination with a housing, of a battery of revolving stirrers longitudinally arranged in the lower portion of the housing, and a plurality of slotted threshing cradles located within the housing and above and transversely to the revolving stirrers.

3. In a cotton threshing machine, the combination with a housing, of a slotted floor formed in the lower portion of the housing and one end of said floor being slightly lower than the other, one of the side walls of the housing being provided with a substantially large discharge opening adjacent to the rear extremity of said housing, a battery of revolving stirrers comprising a plurality of revolving members adapted to run in an opposite direction arranged adjacent to the slotted floor, a plurality of slatted threshing cradles arranged in the housing transversely to the battery of revolving stirrers, a revolving beater comprising arms radiating from a shaft journaled in the housing adapted to revolve in close relation with each slotted thresher cradle, and provision had for receiving cotton stalks into the battery of threshing cradles.

4. In a cotton threshing machine, the combination with the housing, of a number of receiving and threshing cradles arranged in a continuously extended structure from one extremity of the machine to the other, a revolving agitator comprising a plurality of revolving arms adapted to work in close relation to each threshing cradle, a battery of revolving stirrers comprising a plurality of longitudinally arranged shafts with radiating arms with taut wires stretched therebetween transversely arranged in the lower portion of the machine and beneath the threshing cradle.

In testimony whereof I hereunto affix my signature in the presence of two witnesses.

WARREN A. PATTERSON.

Witnesses:
L. T. GRANBERRY,
E. R. LEATH.

Copies of this patent may be obtained for five cents each, by addressing the "Commissioner of Patents, Washington, D. C."